United States Patent
Kamiya (10) Patent No.: US 11,325,550 B2
(45) Date of Patent: May 10, 2022

(54) ELECTRIC POWER DISTRIBUTION APPARATUS

(71) Applicant: DENSO CORPORATION, Kariya (JP)

(72) Inventor: Yuki Kamiya, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/102,693

(22) Filed: Nov. 24, 2020

(65) Prior Publication Data

US 2021/0213897 A1 Jul. 15, 2021

(30) Foreign Application Priority Data

Jan. 10, 2020 (JP) .............................. JP2020-003090

(51) Int. Cl.
| | | |
|---|---|---|
| *B60R 16/033* | (2006.01) | |
| *B60R 16/023* | (2006.01) | |
| *H02J 1/02* | (2006.01) | |
| *H02J 7/00* | (2006.01) | |
| *H02M 1/44* | (2007.01) | |

(52) U.S. Cl.
CPC ........ *B60R 16/033* (2013.01); *B60R 16/0238* (2013.01); *H02J 1/02* (2013.01); *H02J 7/0042* (2013.01); *H02M 1/44* (2013.01); *B60L 2210/10* (2013.01); *B60L 2210/30* (2013.01)

(58) Field of Classification Search
CPC ...... B60R 16/033; B60R 16/0238; H02J 1/02; H02J 7/0042; H02M 1/44; B60L 2210/10; B60L 2210/30
USPC ........................................................ 307/105
See application file for complete search history.

(56) References Cited

U.S. PATENT DOCUMENTS

2018/0301983 A1   10/2018   Okazaki et al.

FOREIGN PATENT DOCUMENTS

JP   2016220345 A   * 12/2016

OTHER PUBLICATIONS

English translations of the description and claims of JP 2016-220345A, Dec. 22, 2016. (Year: 2016).*

* cited by examiner

*Primary Examiner* — Hal Kaplan
(74) *Attorney, Agent, or Firm* — Oliff PLC (57) ABSTRACT

A positive common line and a negative common line are connected to a power source connector connected to a battery pack. First filters are provided on these two common lines, respectively. The positive common line is branched into a positive front line and a positive rear line. The negative common line is branched into a negative front line and a negative rear line. These two front lines are connected to a front power connector that is connected to a front power control unit. These two rear lines are connected to a rear power connector that is connected to a rear power control unit. It is possible to suppress electromagnetic noise on common lines.

7 Claims, 4 Drawing Sheets

ELECTRIC POWER DISTRIBUTION APPARATUS

CROSS REFERENCE TO RELATED APPLICATIONS

The present application is based on and claims the benefit of priority from Japanese Patent Application No. 2020-3090 filed in Japan filed on Jan. 10, 2020, the entire disclosure of the above application is incorporated herein by reference.

TECHNICAL FIELD

Disclosure herein relates to an electric power distribution apparatus comprising a plurality of connectors.

BACKGROUND

Some electric power system has an electric power distribution apparatus. The electric power distribution apparatus distributes an electric power from a power source to a plurality of electric devices. The power source may be a battery, a fuel cell or the like. The system also has at least one power conversion apparatus such as an inverter circuit or a converter circuit. Electromagnetic noise may enter into the system or propagate within the system. In the above aspects, or in other aspects not mentioned, there is a need for further improvements in an electric power distribution apparatus.

SUMMARY

According to an aspect of the disclosure, an electric power distribution apparatus is provided. The electric power distribution apparatus, comprising: a power source connector connected to an in-vehicle power source;

a plurality of power connectors, which are capable of connecting to a plurality of in-vehicle power converters, respectively, and are capable of supplying power to a plurality of in-vehicle electric devices, respectively;

at least one power conductive member, which includes a common conductive member connected to the power source connector and a plurality of branched conductive members branched from the common conductive member to the power connectors, respectively; and a noise reduction element provided on a common conductive member.

According to this configuration, the electromagnetic noise is suppressed at the common conductive member.

In addition, entering of the electromagnetic noise to the in-vehicle power source is suppressed. In a comparison with a plurality of noise reduction elements disposed on a plurality of branched conductive member, respectively, it is possible to reduce a number of elements.

BRIEF DESCRIPTION OF DRAWINGS

The disclosure is further described with reference to the accompanying drawings in which.

DESCRIPTION OF EMBODIMENT

Hereinafter, embodiments and modifications of disclosure is described with reference to the drawings. The embodiments and modifications includes common elements. When a common element is described in a certain embodiment, the description of the common element may be omitted in other embodiments and modifications. The same reference numerals are given to the common elements in each of the plurality of embodiments and modifications.

First Embodiment

An electric power distribution apparatus according to the present embodiment is described with reference to FIG. 1 and FIG. 2. In the following description, a one end and the other end are used. The one end may be referred to as a first end. The other end may be referred to as a second end. The electric power distribution apparatus is applied to an electric vehicle such as a full electric powered vehicle and a plug-in hybrid vehicle.

In this embodiment, a configuration in which the electric power distribution apparatus is applied to an electric vehicle is described as an example. In the following description, an electronic control unit is installed within several units. The electronic control unit includes at least one processor to perform a specific function. The processor may be a logic circuit or the like, which includes an electric circuit configured to perform a specific function. The processor or a part of the processor may be a part of a logic circuit, a Gate Array, a Field Programmable Gate Array, or the like. The processor may be combined with a tangible non-transitional memory storing a program which is readable and executable by the processor. The processor or a part of the processor may be provided by an accelerator, which performs a specific function faster than executing a program.

As shown in JP5936745B, a power conversion apparatus is known in this field. The power conversion apparatus includes components such as an inverter circuit, a capacitor module, a power module, a DCDC converter, a charging device, a controller for a charging device and the DCDC converter, and an inverter controller.

In the power conversion apparatus described in JP5936745B, the components are arranged within a case. Electromagnetic noise may enter into or propagate from in the case. In the above aspects, or in other aspects not mentioned, there is a need for further improvements in an electric power distribution apparatus.

It is an object of the disclosure to provide an electric power distribution apparatus which is capable of suppressing electromagnetic noise.

Power Supply System

Figure 1:
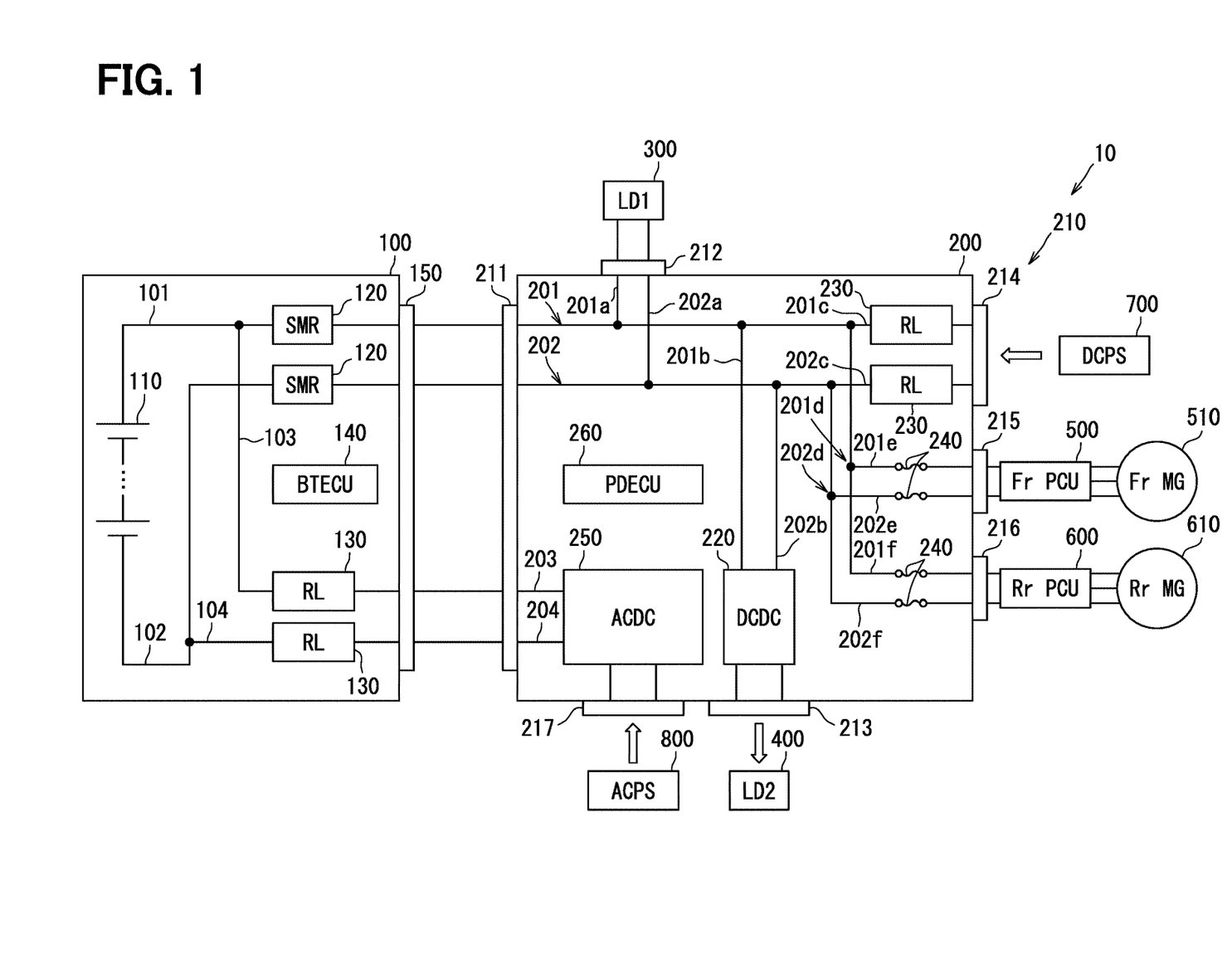
FIG. 1 is a circuit diagram for explaining a power supply system.

As shown in FIG. 1, the electric power distribution apparatus 200 is a one of a plurality of components configuring a vehicle power supply system 10. In addition to the electric power distribution apparatus 200, the power supply system 10 includes a plurality of components. The power supply system 10 includes a battery pack 100, a first vehicle load 300 (LD1), a second vehicle load 400 (LD2), a front PCU 500 (FrPCU), a front MG 510 (FrMG), a rear PCU 600 (RrPCU), and a rear MG 610 (RrMG). The battery pack 100 may be referred to as an internal power source. The first vehicle load 300 and the second vehicle load 400 may be referred to auxiliary loads. Further, the power supply system 10 includes an in-vehicle ECU and an in-vehicle sensor (not shown). The power supply system 10 is capable of being connected to at least one external power source such as a DC power source 700 (DCPS) and/or an AC power source 800 (ACPS). The PCU is an abbreviation for a Power Control Unit. The MG is an abbreviation for a Motor Generator.

The battery pack 100 and the electric power distribution apparatus 200 are electrically connected to each other in the vehicle via a wire harness or the like, which is provided as a power supply path. The first vehicle load 300 and the second vehicle load 400 are electrically connected to the electric power distribution apparatus 200 via a wire harness or the like. Further, the front PCU 500 and the rear PCU 600 are electrically connected to the electric power distribution apparatus 200 via a wire harness or the like. The front MG 510 is electrically connected to the front PCU 500. The rear MG 610 is electrically connected to the rear PCU 600.

Due to the electrical connection configuration, a DC electric power output from the battery pack 100 is supplied to the first vehicle load 300 and the second vehicle load 400 via the electric power distribution apparatus 200. Further, this DC electric power is supplied to the front PCU 500 and the rear PCU 600. The battery pack 100 corresponds to an in-vehicle power source.

Each of the front PCU 500 and the rear PCU 600 includes an inverter circuit and/or a converter circuit for performing power conversion. Further, each of the front PCU 500 and the rear PCU 600 includes at least one electric control unit. The front PCU 500 and the rear PCU 600 convert a supplied DC electric power into an AC electric power. On the contrary, the front PCU 500 and the rear PCU 600 convert a supplied AC electric power into a DC electric power. The front PCU 500 and the rear PCU 600 correspond to the in-vehicle power conversion unit.

The front MG 510 and the rear MG 610 are motor generators for traveling the vehicle to make the vehicle running. The front MG 510 is powered by the AC electric power supplied from the front PCU 500. The rear MG 610 is powered by the AC electric power supplied from the rear PCU 600. The front MG 510 generates power to rotate a front wheel of the vehicle. The rear MG 610 generates power to rotate a rear wheel of the vehicle. The front MG 510 and the rear MG 610 correspond to in-vehicle electrical devices, respectively.

The front MG 510 and the rear MG 610 regeneratively generate electricity by receiving the propulsive force of the vehicle. The AC electric power generated by this regenerative power generation is converted into a DC electric power by the front PCU 500 and the rear PCU 600. The DC electric power is supplied to the first vehicle load 300 and the second vehicle load 400 via the electric power distribution apparatus 200. Further, the DC electric power is supplied to the battery pack 100 via the electric power distribution apparatus 200.

Hereinafter for convenience, the DC electric power supplied from the battery pack 100 is referred to as an in-vehicle source electric power. The electric power generated by the regenerative power generation and converted into the DC electric power by the front PCU 500 and the rear PCU 600 is referred to as a regenerative electric power.

The first vehicle load 300 is, for example, a heater mounted on the vehicle, an air-conditioning device, and an external load connected to an outlet of the vehicle. The in-vehicle source electric power and the regenerative electric power are supplied to the first vehicle load 300 via the electric power distribution apparatus 200. Further, as is described later, when an external power source from an outside is connected to the electric power distribution apparatus 200, a charging electric power is supplied to the first vehicle load 300. The charging electric power may be referred to as an external electric power.

As shown in FIG. 1, the electric power distribution apparatus 200 includes a DCDC converter circuit 220. The DCDC converter circuit 220 is supplied with the in-vehicle source electric power, the regenerative electric power, and the charging electric power. The DCDC converter circuit 220 steps down supplied electric power to 12V and supplies it to the second vehicle load 400. The second vehicle load 400 is, for example, a speaker, a power window, a power steering device, and the like.

The DC power source 700 from the outside may be connected to the electric power distribution apparatus 200. A DC charging electric power output from the DC power source 700 is supplied to the battery pack 100, the first vehicle load 300, and the DCDC converter circuit 220. As a result, the battery pack 100 is charged. The charging electric power is supplied to the first vehicle load 300, and 12V DC electric power is supplied from the DCDC converter circuit 220 to the second vehicle load 400.

The electric power distribution apparatus 200 includes an ACDC converter circuit 250. The AC power source 800 is connected to the ACDC converter circuit 250 from the outside. The ACDC converter circuit 250 converts the AC electric power supplied from the AC power source 800 into the DC electric power. This DC electric power is supplied to the battery pack 100 as a charging electric power. As a result, the battery pack 100 is charged. The charging electric power is also supplied to the first vehicle load 300 and the DCDC converter circuit 220 by controlling the system relay 120 described later. The DC power source 700 and the AC power source 800 correspond to the external power sources.

As shown above, the electric power distribution apparatus 200 performs a function of supplying the electric power from both the power source and the regenerative power source outputted in the vehicle to various electric devices mounted on the vehicle. The electric power distribution apparatus 200 performs a function of supplying charging power supplied from an external power source to various electric devices mounted on the vehicle. Hereinafter, components included in the battery pack 100 and the electric power distribution apparatus 200 are described.

Battery Pack

The battery pack 100 includes an assembled battery 110, system relays 120 (SMR), power relays 130 (RL), a battery ECU 140 (BTECU), and a battery connector 150. The battery ECU 140 controls operation of the system relays 120 and the power relays 130. The battery ECU 140 includes at least one electric control unit. An output of the assembled battery 110 to the battery connector 150 side is controlled to be energized and shut off by driving the system relay 120 and the power relay 130.

The assembled battery 110 has a plurality of battery cells connected in series. A voltage corresponding to a potential difference between a positive terminal of the battery cell having the highest potential and a negative terminal of the battery cell having the lowest potential among the plurality of battery cells connected in series corresponds to a power source voltage of the assembled battery 110. As the battery cell included in the assembled battery 110, a secondary battery such as a lithium ion battery can be adopted.

One end of a first power source line 101 is connected to the positive terminal of the battery cell located at the highest potential among the plurality of battery cells connected in series. One end of a second power source line 102 is connected to the negative terminal of the battery cell located at the lowest potential. The other ends of the first power supply line 101 and the second power supply line 102 are provided in and connected to the battery connector 150.

The system relays 120 are provided in the first power source line 101 and the second power source line 102, respectively. The system relays 120 are mechanical switch elements. The system relays 120 are normally closed type switch elements that are turned off by inputting drive signals from the battery ECU 140 and turned on by interrupting the drive signals. SMR is an abbreviation for System Main Relay.

One end of a third power source line 103 is connected to an intermediate point between the assembled battery 110 and the system relay 120 in the first power source line 101. One end of a fourth power source line 104 is connected to an intermediate point between the assembled battery 110 and the system relay 120 in the second power source line 102. The other ends of the third power source line 103 and the fourth power source line 104 are provided in and connected to the battery connector 150.

The power relays 130 are provided in the third power source line 103 and the fourth power source line 104, respectively. The power relays 130 are mechanical switch elements. The power relays 130 are normally open type switch elements that are turned on by inputting drive signals from the battery ECU 140 and turned off by interrupting the drive signals.

The battery ECU 140 communicates with at least one of the other in- vehicle-mounted ECUs and the power distribution ECU 260 described later via wiring (not shown). The battery ECU 140 controls operation of the system relays 120 and the power relays 130 based on vehicle signals including vehicle information input from communication with these ECUs and in-vehicle sensors.

As described above, the battery connector 150 is provided with the other ends of the first to fourth power source lines 101 to 104. Electrical connections and disconnections of the first to fourth power source lines 101 to 104 are controlled and switched by the system relays 120 and the power relays 130 controlled by the battery ECU 140. The battery ECU 140 controls the system relays 120 and the power relays 130 by switching drive signals between output (on) and non-output (off). The other ends of these four power source lines are capable of being connected to the electric power distribution apparatus 200.

Power Distribution Apparatus

The electric power distribution apparatus 200 includes at least one distribution connector 210, a DCDC converter circuit 220 (DCDC), DC relays 230 (RL), fuses 240, an ACDC converter circuit 250 (ACDC), and a power distribution ECU 260 (PDECU).

The distribution connector 210 includes a power source connector 211, a first load connector 212, a second load connector 213, a DC external power source connector 214, a front power connector 215, a rear power connector 216, and an AC external power source connector 217. The power source connector 211 may be referred to as an internal power source connector. The first load connector 212 and the second load connector 213 may be referred to as auxiliary load connectors. The front power connector 215 and the rear power connector 216 may be referred to as power connectors. The DC external power source connector 214 and the AC external power source connector 217 may be referred to as external power source connectors.

The power source connector 211 is provided with one ends of the first to fourth power lines 201 to 204. The battery connector 150 of the battery pack 100 is connectable to the power source connector 211.

One end of the first power line 201 is connectable and disconnectable to the other end of the first power source line 101 at the battery connector 150 and the power source connector 211. One end of the second power line 202 is connectable and disconnectable to the other end of the second power source line 102 at the battery connector 150 and the power source connector 211. As a result, when the battery connector 150 and the power source connector 211 are coupled and the system relays 120 of the assembled battery 110 are turned on by the battery ECU 140, the first power line 201 and the second power line 202 are electrically connected to the assembled battery 110. On the contrary, when the system relays 120 are turned off, the electrical connections to the assembled battery 110 via the first power line 201 and the second power line 202 are cut off.

The first power line 201 is branched from a first main wiring into a plurality of positive lines. Similarly, the second power line 202 is branched from a second main wiring into a plurality of negative lines.

A plurality of pairs of the distal end of the positive line and the distal end of the negative line are provided in a plurality of load connectors 212 to 216. In other words, a plurality of pairs of the other ends of the first power line 201 and the second power line 202 are provided in a plurality of load connectors 212 to 216. For example, one pair of the other ends of the first power line 201 and the second power line 202 are provided in the first load connector 212. The other one pair of the other ends of the first power line 201 and the second power line 202 are provided in the second load connector 213. The other one pair of the other ends of the first power line 201 and the second power line 202 are provided in the front power connector 215. The other one pair of the other ends of the first power line 201 and the second power line 202 are provided in the rear power connector 216. The DCDC converter circuit 220, the DC relays 230, and the fuses 240 are provided on the positive line and the negative line. The positive line and the negative line are described in detail later.

One end of the third power line 203 is connectable and disconnectable to the other end of the third power source line 103 at the battery connector 150 and the power source connector 211. One end of the fourth power line 204 is connectable and disconnectable to the other end of the fourth power source line 104 at the battery connector 150 and the power source connector 211. As a result, when the battery connector 150 and the power source connector 211 are coupled and the power relays 130 of the assembled battery 110 are turned on by the battery ECU 140, the third power line 203 and the fourth power line 204 are electrically connected to the assembled battery 110. When the battery connector 150 and the power source connector 211 are decoupled or the power relays 130 of the assembled battery 110 are turned off by the battery ECU 140, the third power line 203 and the fourth power line 204 are electrically disconnected to the assembled battery 110.

The ACDC converter circuit 250 is provided on the third power line 203 and the fourth power line 204. A pair of the other ends of the third power line 203 and the fourth power line 204 is provided in the AC external power source connector 217. The AC power source 800 is connected to the AC power source connector 217 from the outside. As a result, when the power relays 130 are turned on, the assembled battery 110 and the AC power source 800 are electrically connected via the ACDC converter circuit 250.

The power distribution ECU 260 communicates with at least one of the in-vehicle-mounted ECUs and the battery ECU 140 via wiring (not shown). The power distribution ECU 260 includes at least one electric control unit. The power distribution ECU 260 controls operations of the DCDC converter circuit 220, the DC relays 230, and the ACDC converter circuit 250 based on vehicle signals including vehicle information input from communication with these ECUs and in- vehicle sensors not shown.

As described above, the DC power source 700 and the AC power source 800 may be connected to the electric power distribution apparatus 200 from the outside as external power sources. When these external power sources are, for example, an electric power charging station, the power distribution ECU 260 communicates with a control unit disposed in the electric power charging station. The power distribution ECU 260 outputs this communication result to the in-vehicle ECUs and the battery ECU 140. The power distribution ECU 260 controls operation of the DCDC converter circuit 220, the DC relays 230, and the ACDC converter circuit 250 based on the communication result and the vehicle information. Similarly, the battery ECU 140 controls operation of the system relays 120 and the power relays 130 based on the communication result and the vehicle information.

Positive Line and Negative Line As shown in FIG. 1, the first power line 201 is branched from the first main wiring into four lines including: a first positive line 201a, a second positive line 201b, a third positive line 201c, and a fourth positive line 201d. The second power line 202 is branched from the second main wiring into four lines including: a first negative line 202a, a second negative line 202b, a third negative line 202c, and a fourth negative line 202d.

A pair of the distal ends of the first positive line 201a and the first negative line 202a is provided in the first load connector 212. As a result, when the system relays 120 are turned on, the assembled battery 110 and the first vehicle load 300 are electrically connected.

A pair of the distal ends of the second positive line 201b and the second negative line 202b is provided in the second load connector 213. The DCDC converter circuit 220 is provided on the second positive line 201b and the second negative line 202b. As a result, when the electric power is supplied to the DCDC converter circuit 220, 12V DC electric power is supplied to the second vehicle load 400.

A pair of the distal ends of the third positive line 201c and the third negative line 202c is provided in the DC power source connector 214. The DC relays 230 are provided on the third positive line 201c and the third negative line 202c, respectively. As a result, when the DC relays 230 are turned on, the first vehicle load 300 and the DCDC converter circuit 220 are electrically connected to the DC power source 700. Further, when the system relays 120 are turned on, the assembled battery 110 is electrically connected to the DC power source 700.

The DC relays 230 are mechanical switch elements. The DC relays 230 are normally open type switch elements that are turned on by inputting drive signals from the power distribution ECU 260 and turned off by interrupting the drive signals. The DC relays 230 correspond to switch elements.

The fourth positive line 201d is branched into two, a positive front line 201e and a positive rear line 201f. The fourth negative line 202d is branched into two, a negative front line 202e and a negative rear line 202f. Fuses 240 are provided on these four lines, respectively.

A pair of the distal ends of the positive front line 201e and the negative front line 202e is provided in the front power connector 215. The front PCU 500 is connected to the front power connector 215. As a result, the first vehicle load 300 and the DCDC converter circuit 220 are each electrically connected to the front PCU 500. When the system relays 120 are turned on, the assembled battery 110 and the front PCU 500 are electrically connected.

A pair of the distal ends of the positive rear line 201f and the negative rear line 202f is provided in the rear power connector 216. The rear PCU 600 is connected to the rear power connector 216. As a result, the first vehicle load 300 and the DCDC converter circuit 220 are each electrically connected to the rear PCU 600. When the system relays 120 are turned on, the assembled battery 110 and the rear PCU 600 are electrically connected.

Operation of Power Supply System

The operation of the power supply system 10 is described below. The battery ECU 140 turns on the system relays 120 during normal times such as when the vehicle is parked or stopped or during normal running. Further, the battery ECU 140 turns off the power relays 130. The power distribution ECU 260 turns off the DC relays 230.

As a result, the in-vehicle source electric power of the assembled battery 110 is supplied to the first vehicle load 300, the DCDC converter circuit 220, the front PCU 500, and the rear PCU 600. On the contrary, the regenerative electric power of the front MG 510 and the rear MG 610 are supplied to the first vehicle load 300, the DCDC converter circuit 220, and the assembled battery 110.

When the DC power source 700 is connected to the electric power distribution apparatus 200 in a parked or stopped state during performing a DC charging, the battery ECU 140 turns on the system relay 120. Further, the battery ECU 140 turns off the power relays 130. The power distribution ECU 260 turns on the DC relays 230.

As a result, the DC electric power supplied from the DC power source 700 is supplied to the assembled battery 110, the first vehicle load 300, and the DCDC converter circuit 220. An amount of electric power supplied to the first vehicle load 300 is determined according to a required power of the first vehicle load 300.

When the AC power source 800 is connected to the electric power distribution apparatus 200 in a parked or stopped state during performing an AC charging, the battery ECU 140 turns on the system relay 120 and the power source relay 130, respectively. The power distribution ECU 260 turns off the DC relays 230.

As a result, the AC electric power supplied from the AC power source 800 is converted into the DC electric power by the ACDC converter circuit 250. This DC electric power is supplied to the assembled battery 110, the first vehicle load 300, and the DCDC converter circuit 220. An amount of electric power supplied to the first vehicle load 300 is determined according to a required power of the first vehicle load 300.

In-Vehicle State

Next, a vehicle-mounted state of the electric power distribution apparatus 200 is described with reference to FIG. 2. In FIG. 2, a part of the power line, the DCDC converter circuit 220, the DC relays 230, the fuses 240, the ACDC converter circuit 250, and the power distribution ECU 260 are not shown. Further, an illustration of a lid member described later is omitted.

In the following, the three directions orthogonal to each other are referred to as the x-direction, the y-direction, and the z-direction. One of the x-direction and the y-direction corresponds to the left and right direction of the vehicle, and the other one corresponds to a front and rear direction of the vehicle, i.e., a traveling and reverse direction. The z-direction corresponds to a top and bottom direction of the vehicle.

Figure 2:
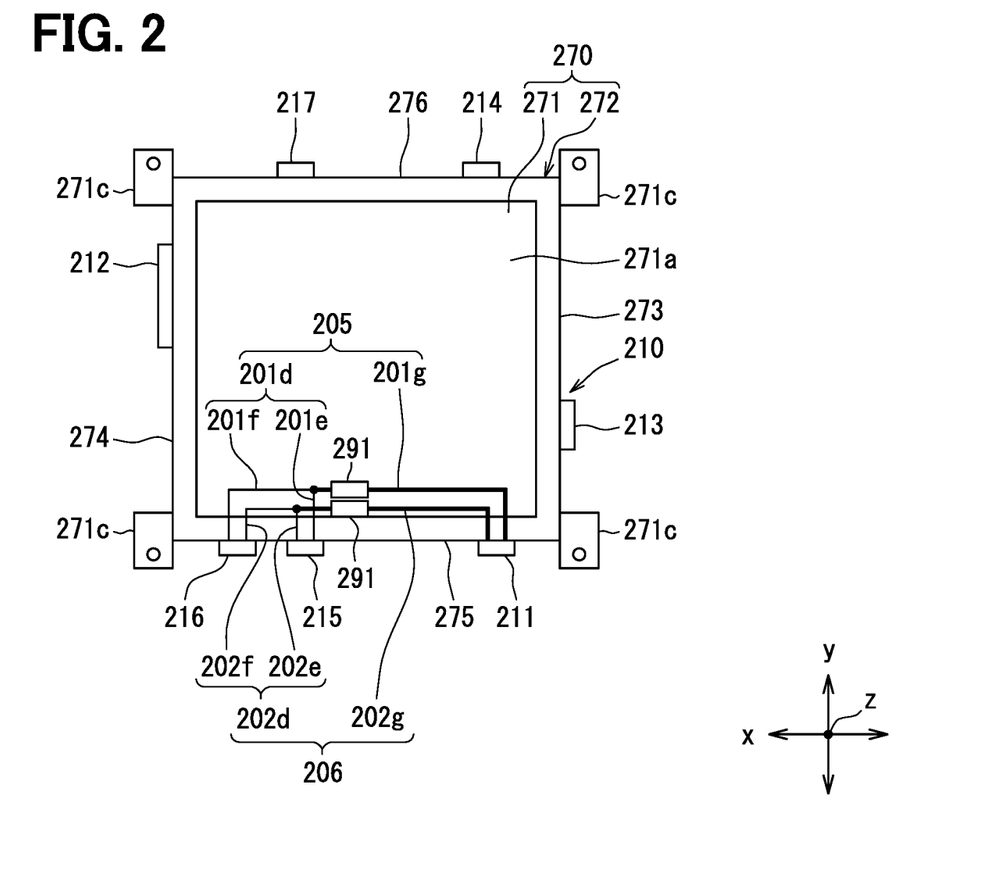
FIG. 2 is a schematic diagram for explaining a power line and a first filter.

In addition to the electric devices described so far, the electric power distribution apparatus 200 includes a case 270 shown in FIG. 2 and a lid member that closes an opening of the housing 270. The case 270 may be referred to as a frame. The case 270 has a bottom wall 271 having a thin thickness in the z-direction, and a side wall 272 that rises in an annular shape in the z-direction from the inner bottom surface 271a of the bottom wall 271.

An outer bottom surface on a back side of the inner bottom surface 271a is provided on a side rather close to the underbody side of the vehicle in the z-direction with respect to the inner bottom surface 271a. A flange portion 271c for bolting the electric power distribution apparatus 200 to an underbody is integrally connected to the bottom wall 271 providing the outer bottom surface.

Inner Wall and Outer Wall

As shown in FIG. 2, the side wall 272 includes an inner horizontal wall 273 and an outer horizontal wall 274, which are arranged apart from each other in the x-direction. The side wall 272 includes an inner vertical wall 275 and an outer vertical wall 276, which are arranged apart from each other in the y-direction. The side wall 272 forms an annular shape by connecting these four walls side by side in the circumferential direction around the z-direction.

These four walls are arranged to face horizontal sides of the vehicle in the mounted state of the vehicle. In the x-direction, the inner horizontal wall 273 is arranged inside the vehicle rather than the outer horizontal wall 274. In the y-direction, the inner vertical wall 275 is arranged inside the vehicle rather than the outer vertical wall 276.

Connector Arrangement

Those four walls of the side wall 272 have notches, apertures, and the like are formed in order to provide the distribution connectors 210. Among the four walls, the power source connector 211, the front power connector 215, and the rear power connector 216 are provided on the inner horizontal wall 273 or the inner vertical wall 275 which are relatively arranged on the inside of the vehicle. The DC power source connector 214 and the AC power source connector 217 are provided on the outer horizontal wall 274 or the outer vertical wall 276 which are relatively arranged on the outside of the vehicle. The first load connector 212 and the second load connector 213 may be provided on any of these four walls.

According to the configuration described above, the power source connector 211, the front power connector 215, and the rear power connector 216 are provided on an inner side of the vehicle than the DC external power source connector 214 and the AC external power source connector 217. In this way, the connectors used during running the vehicle are provided on an inner side of the vehicle than the connectors used during supplying the external power source.

As specifically shown in FIG. 2, in the present embodiment, the inner vertical wall 275 is provided with the power source connector 211, the front power connector 215, and the rear power connector 216. On the inner vertical wall 275, the power source connector 211, the front power connector 215, and the rear power connector 216 are arranged next to each other in the x-direction.

The DC power source connector 214 and the AC power source connector 217 are provided on the outer vertical wall 276. The second load connector 213 is provided on the inner horizontal wall 273. The first load connector 212 is provided on the outer horizontal wall 274.

The second load connector 213 functions to supply 12V DC power to the in-vehicle devices involved in a vehicle running function. Therefore, it is preferable that the second load connector 213 is arranged inner side of the vehicle rather than the DC power source connector 214 and the AC power source connector 217. In the present embodiment, the second load connector 213 is provided on the inner horizontal wall 273 and is provided on a portion of the inner horizontal wall 273 closer to the inner vertical wall 275 in the y-direction.

Arrangement of Electrical Components

If the electric devices accommodated in the case 270 are classified into a first device group, which includes devices used during running the vehicle, and a second device group, which includes devices used during supplying the external power source, the devices in the first device group are arranged on an inner side of the vehicle rather than the devices in the second device group.

The first device group includes the DCDC converter circuit 220, the fuses 240, and the power distribution ECU 260. The second device group includes the DC relay 230 and the ACDC converter circuit 250. The power distribution ECU 260 is used both during running and during external power supplying, but is included in the first device group because it is related to drive control during running. However, it is also possible to adopt a configuration in which at least a part of the first device group is provided on an outer side of the vehicle than the second device group.

Power Supply Line

In the following for convenience, a part connecting the power source connector 211 and the front power connector 215 and a part connecting the power source connector 211 and the rear power connector 216 are collectively referred to as a first power supply line 205 in the first power line 201. A part connecting the power source connector 211 and the front power connector 215 and a part connecting the power source connector 211 and the rear power connector 216 are collectively referred to as a second power supply line 206 in the second power line 202.

FIG. 2 briefly shows the first power supply line 205 and the second power supply line 206. A pair of one ends of the first power supply line 205 and the second power supply line 206 is provided in the power source connector 211. A pair of the other ends of the first power supply line 205 and the second power supply line 206 is branched into a plurality of connectors. A pair of the other ends of the first power supply line 205 and the second power supply line 206 is provided in the front power connector 215. A pair of the other ends of the first power supply line 205 and the second power supply line 206 is provided in the rear power connector 216.

The first power supply line 205 and the second power supply line 206 are provided on an inner side of the vehicle than the DC power source connector 214 and the AC power source connector 217 used during supplying the external power source. In the present embodiment, the first power supply line 205 and the second power supply line 206 are provided on a side close to the inner vertical wall 275 in the y-direction. Both the first power supply line 205 and the second power supply line 206 are arranged along inner walls, i.e., along the inner vertical wall 275.

The first power supply line 205 includes the positive common line 201g and the above-mentioned fourth positive line 201d. The positive common line 201g is included in the first main wiring described above. The fourth positive line 201d has the above-mentioned positive front line 201e and the positive rear line 201f.

One end of the positive common line 201g corresponds to one end of the first power supply line 205, and is provided in the power source connector 211. One end of the positive front line 201e and one end of the positive rear line 201f are connected to the other end of the positive common line 201g. The other end of the positive common line 201g is a first branch point that branches into these two positive lines.

The other ends of the positive front line 201e and the positive rear line 201f correspond to the other ends of the first power supply line 205. The other end of the positive front line 201e is provided in the front power connector 215. The other end of the positive rear line 201f is provided in the rear power connector 216.

The second supply line 206 includes the negative common line 202g and the above-mentioned fourth negative line 202d. The negative common line 202g is included in the second main wiring described above. The fourth negative line 202d has the above-mentioned negative front line 202e and the negative rear line 202f.

One end of the negative common line 202g corresponds to one end of the second power supply line 206, and is provided in the power source connector 211. One end of the negative front line 202e and one end of the negative rear line 202f are connected to the other end of the negative common line 202g. The other end of the negative common line 202g is a second branch point that branches into these two negative lines.

The other ends of the negative front line 202e and the negative rear line 202f correspond to the other ends of the second power supply line 206. The other end of the negative front line 202e is provided in the front power connector 215. The other end of the negative rear line 202f is provided in the rear power connector 216.

The positive common line 201g and the negative common line 202g each extend in the y-direction and then in the x-direction so as to be separated from the power source connector 211. The positive common line 201 g and the negative common line 202g have the same length. The positive common line 201g and the negative common line 202g extend in the x-direction and the y-direction in a manner that these lines are arranged next to each other and run in parallel.

The positive front line 201e extends from the first branch point of the positive common line 201g toward the front power connector 215. The positive rear line 201f extends from the first branch point toward the rear power connector 216. These two positive lines are shorter than the positive common line 201g.

The negative front line 202e extends from the second branch point of the negative common line 202g toward the front power connector 215. The negative rear line 202f extends from the second branch point toward the rear power connector 216. These two negative lines are shorter than the negative common line 202g.

The positive front line 201e and the negative front line 202e have the same length. These two front lines extend in the x-direction and the y-direction in a manner that these lines are arranged next to each other and run in parallel.

The positive rear line 201f and the negative rear line 202f have the same length. These two rear lines extend in the x-direction and the y-direction in a manner that these lines are arranged next to each other and run in parallel.

The positive common line 201g corresponds to a common conductive member. The negative common line 202g corresponds to a common conductive member. The positive common line 201g and the negative common line 202g provide two common conductive members. The positive front line 201e and the positive rear line 201f correspond to the branched conductive members for the first power supply line 205. The negative front line 202e and the negative rear line 202f correspond to the branched conductive members for the second power supply line 206. The positive front line 201e and the positive rear line 201f, the negative front line 202e, and the negative rear line 202f provide four branched conductive members. The first power supply line 205 corresponds to a power conductive member. The second power supply line 206 corresponds to a power conductive member. The first power supply line 205 and the second power supply line 206 provide two power conductive members.

First Filter

In addition to the electric devices described so far, the electric power distribution apparatus 200 has at least one first filter 291. As shown in FIG. 2, the electric power distribution apparatus 200 may have two first filters 291. One of the first filters 291 is provided on the first power supply line 205. The other one of the first filters 291 is provided on the second power supply line 206, respectively. As a result, the first filters 291 are provided on the first power supply line 205 and the second power supply line 206, respectively. The first filters 291 have functions of reducing noise components on current such as ripples input from the front PCU 500 and the rear PCU 600. At least one of the first filters 291 corresponds to a noise reduction element. The first filter 291 may be referred to as a noise removing element.

A frequency band of noise components on current is approximately 2.0 MHz. As an element having a noise reducing function, for example, a ferrite core, a capacitor, a filter circuit, or the like may be adopted. As the ferrite, for example, a spinel ferrite, a hexagonal crystal ferrite, a garnet ferrite, or the like may be adopted. These elements can be adopted as the first filter 291.

When a ferrite core is adopted as the first filter 291, the first filter 291 may be provided on both two common lines so that the first filter 291 collectively surrounds both the positive common line 201g and the negative common line 202g running side by side. Therefore, although FIG. 2 illustrates that two first filters 291 are provided on two common lines, respectively, it is possible to adopt a configuration in which a single first filter 291 is provided commonly on two common lines.

When a capacitor is adopted as the first filter 291, two capacitors are provided on two common lines, respectively. For example, at least one first capacitor is arranged so that one capacitor electrode among two capacitor electrodes is connected to the positive common line 201g. The other one of the two capacitor electrode of the first capacitor is connected to a ground. At least one second capacitor, which is different from the first capacitor, is arranged so that a one capacitor electrode among two capacitor electrodes is connected to the negative common line 202g. The other one of the two capacitor electrode of the second capacitor is connected to the ground. Two of the other capacitor electrodes of the first capacitor and the second capacitor may be connected as a single wiring and the single wiring may be connected to the ground.

As simply shown in FIG. 2, the first filters 291 provided on the first power supply line 205 and the second power supply line 206 are provided on portions close to the other ends, i.e., branched ends. On the first power supply line 205 and the second power supply line 206, the first filters 291 are provided on portions closer to the other ends than the one ends. In the first power supply line 205, a total length from a portion, on which the first filter 291 is provided, to the one end provided in the power source connector 211 is a first distance L1. In the second power supply line 206, a total length from a portion, on which the first filter 291 is provided, to the one end provided in the power source connector 211 is a first distance L1. Although, the first distances L1 may be slightly different in the first power supply line 205 and the second power supply line 206, it is possible to consider the first distances L1 as the same. In the first power supply line 205, a total length from the portion of the first filter 291 to the other end provided in the front power connector 215 or the rear power connector 216 is a second distance L2. In the second power supply line 206, a total length from the portion of the first filter 291 to the other end provided in the front power connector 215 or the rear power connector 216 is a second distance L2. Although, the second distances L2 may be slightly different in the first power supply line 205 and the second power supply line 206, it is possible to consider the second distances L2 as the same. The second distance L2 is shorter than the first distance L1 (L2<L1).

As described above, the first filter 291 is provided on a portion of the power supply line closer to the other end than the one end thereof. The first filter 291 is provided on a portion of the positive common line 201g and/or the negative common line 202g. The first filter 291 is still provided on the positive common line 201g and/or the negative common line 202g, and is not provided on any one of the positive front line 201e, the positive rear line 201f, the negative front line 202e, and the negative front line 202f. More specifically, the first filter 291 is provided on a portion of at least one of the positive common line 201g and the negative common line 202 closer to the other end than the one end thereof. In other words, the first filter 291 is provided on a portion of the common line close to the branch point, branching to both the positive front line 201e and the positive rear line 201f, or both the negative front line 202e and the negative front line 202f.

Operation and Advantage

As described above, the first filters 291 are provided on both the first supply line 205 and the second supply line 206. According to this, the current noise flowing into the electric power distribution apparatus 200 from the front PCU 500 and the rear PCU 600 can be reduced. Entering of this current noise into the battery pack 100 is suppressed.

As described above, the first power supply line 205 has the positive front line 201e, the positive rear line 201f, and the positive common line 201g that is commonly connected to these two positive lines. The first filter 291 is provided on the positive common line 201g.

Similarly, the second supply line 206 has the negative front line 202e, the negative rear line 202f, and the negative common line 202g that is commonly connected to these two negative lines. The first filter 291 is provided on the negative common line 202g.

According to this, it is possible to suppress an increase in a number of elements as compared with a configuration in which a plurality of first filters 291 are provided on each of the front lines and the rear lines.

Further, when a ferrite core is adopted as the first filter 291, a single first filter 291 is provided on both the positive common line 201g and the negative common line 202g running side by side in parallel. The ferrite core may provide a single magnetic path surrounding both the positive common line 201g and the negative common line 202g. The single first filter 291 functions as a common element on both the positive common line 201g and the negative common line 202g. As a result, it is possible to suppress an increase in a number of elements as compared with a configuration in which two first filters 291 are provided on two common lines, respectively.

As a matter of course, noise components on current may not be reduced until entering into the first filter 291. The noise components may propagate electromagnetic noise while flowing from the other end side of each of the first supply line 205 and the second supply line 206 to a portion on which the first filter 291 is provided. The electromagnetic noise may be propagated to an inner cavity of the case 270.

On the other hand, the first filter 291 is provided on the other end side of the first supply line 205 and the second supply line 206. More specifically, the first filter 291 is provided on a portion of at least one of the positive common line 201g and the negative common line 202 closer to the other end than the one end thereof. In other words, the first filter 291 is provided on a portion of the common line close to the branch point, branching to both the positive front line 201e and the positive rear line 201f, or both the negative front line 202e and the negative front line 202f. Therefore, the current noise flows through the common line until the current noise reaches the first filter 291. A distance of the common line through which the current noise flows is shortened. For example, the current noise only flows a distance from the branch point to the first filter 291 in the common line. As a result, it is possible to reduce propagation of electromagnetic noise into the inner cavity of the case 270.

Each of the positive front line 201e and the positive rear line 201f is shorter than the positive common line 201g. Each of the negative front line 202e and the negative rear line 202f is shorter than the negative common line 202g.

According to this, the distance through which the current noise flows between the two branched positive lines and the two branched negative lines is shortened. As a result, it is possible to reduce propagation of electromagnetic noise into the inner cavity of the case 270.

The power source connector 211, the front power connector 215, and the rear power connector 216, which are used during running the vehicle, are provided on an inner side of the vehicle than the other connectors.

Therefore, it is possible to prevent the power source connector 211, the front power connector 215, and the rear power connector 216 from being damaged due to an external force applied from the outside to the inside of the vehicle. It is possible to prevent the battery pack 100 from interfering with power supply to the front PCU 500 and the rear PCU 600. As a result, it is possible to prevent problems in supplying power to the front MG 510 and the rear MG 610. It is possible to prevent the vehicle from becoming difficult to drive due to the external force.

Further, the first power supply line 205 and the second power supply line 206, which electrically connect a pair of the power source connector 211 and the front power connector 215, and a pair of the power source connector 211 and the rear power connector 216, .

Therefore, it is possible to prevent failure on those supply lines due to the external force. It is possible to prevent the vehicle from troubles in supplying electric power to the front MG 510 and the rear MG 610, As described above, the power source connector 211, the front power connector 215, and the rear power connector 216, and the first power supply line 205 and the second power supply line 206, which connect these three connectors, are provided on an inner side of the vehicle Specifically in this embodiment, the power source connector 211, the front power connector 215, and the rear power connector 216 are provided on the inner vertical wall 275. These three connectors are arranged next to each other in the x-direction. The first power supply line 205 and the second power supply line 206 are provided on a side close to the inner vertical wall 275 in the y-direction. Both the first power supply line 205 and the second power supply line 206 are arranged along the inner vertical wall 275. Due to this arrangement configuration, it is possible to reduce an increase in wiring length of each of the first power supply line 205 and the second power supply line 206.

The DCDC converter circuit 220, the fuses 240, and the power distribution ECU 260 included in the first device group used when the vehicle is running are provided on an inner side of the vehicle.

Therefore, it is possible to prevent failure on the first device due to the application of an external force to the vehicle. It is possible to prevent troubles in supplying electric power to the MG.

Second Embodiment

Figure 3:
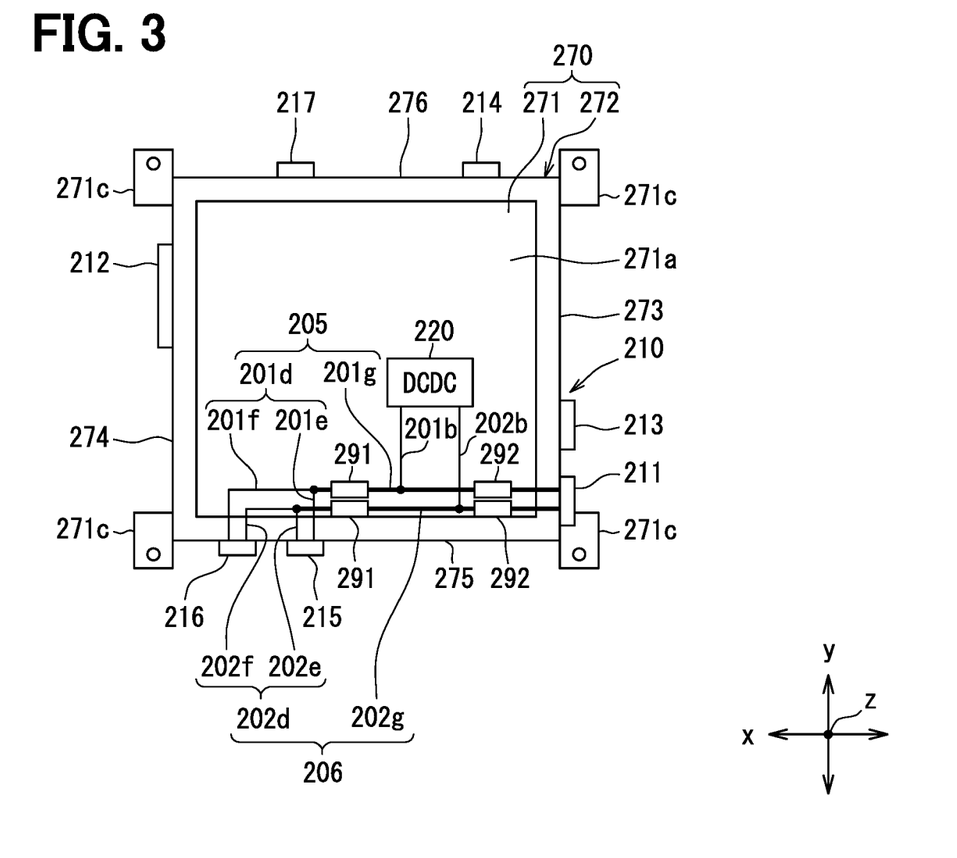
FIG. 3 is a schematic diagram for explaining a power line and a first filter according to a second embodiment.

Next, a second embodiment is described with reference to FIG. 3.

The first embodiment shows an example in which the first filter 291 is provided on a portion closer to the other end of the positive common line 201g and the negative common line 202g. On the other hand, in this present embodiment, for example, as shown in FIG. 3, the first filter 291 is provided on a portion closer to the other end of the positive common line 201g and the negative common line 202g, and the second filter 292 is provided on a portion closer to the one end side of the positive common line 201g and the negative common line 202g. In this embodiment, the power source connector 211 is provided on the inner horizontal wall 273 and is provided on a portion of the inner horizontal wall 273 close to the inner vertical wall 275.

The second positive line 201b is connected to an intermediate point between a portion where the first filter 291 is arranged and a portion where the second filter 292 is arranged on the positive common line 201g. The second negative line 202b is connected to an intermediate point between a portion where the first filter 291 is arranged and a portion where the second filter 292 is arranged on the negative common line 202g. As described above, the DCDC converter circuit 220 is provided on the second positive line 201b and the second negative line 202b.

The DCDC converter circuit 220 corresponds to a power converter circuit. The second positive line 201b corresponds to an internal conductive member. The negative line 202b corresponds to an internal conductive member. The second positive line 201b and the second negative line 202b provides two internal conductive members. The second filter 292 corresponds to a noise filter.

The second filter 292 has a function of reducing current noise input from the DCDC converter circuit 220. This current noise is mainly caused by switching of the switch element included in the DCDC converter circuit 220, and its frequency band is about 1.0 MHz. As described above, the frequency band of the current noise to be reduced is different between the second filter 292 and the first filter 291. As an element having a noise reducing function, for example, a ferrite core, and a capacitor, or the like may be adopted.

The current noise may enter from the front PCU 500 and/or the rear PCU 600. The current noise may enter from the DCDC converter circuit 220. According to the configuration shown above, it is possible to suppress the current noise flowing through the positive common line 201g and the negative common line 202g. The current noise input from the front PCU 500 and the rear PCU 600 is suppressed from being input to the DCDC converter circuit 220.

The electric power distribution apparatus 200 described in the present embodiment includes components equivalent to those of the electric power distribution apparatus 200 described in the first embodiment. Therefore, the similar effect can be provided. This also applies to embodiments shown below. This description will be omitted below.

Third Embodiment

Figure 4:
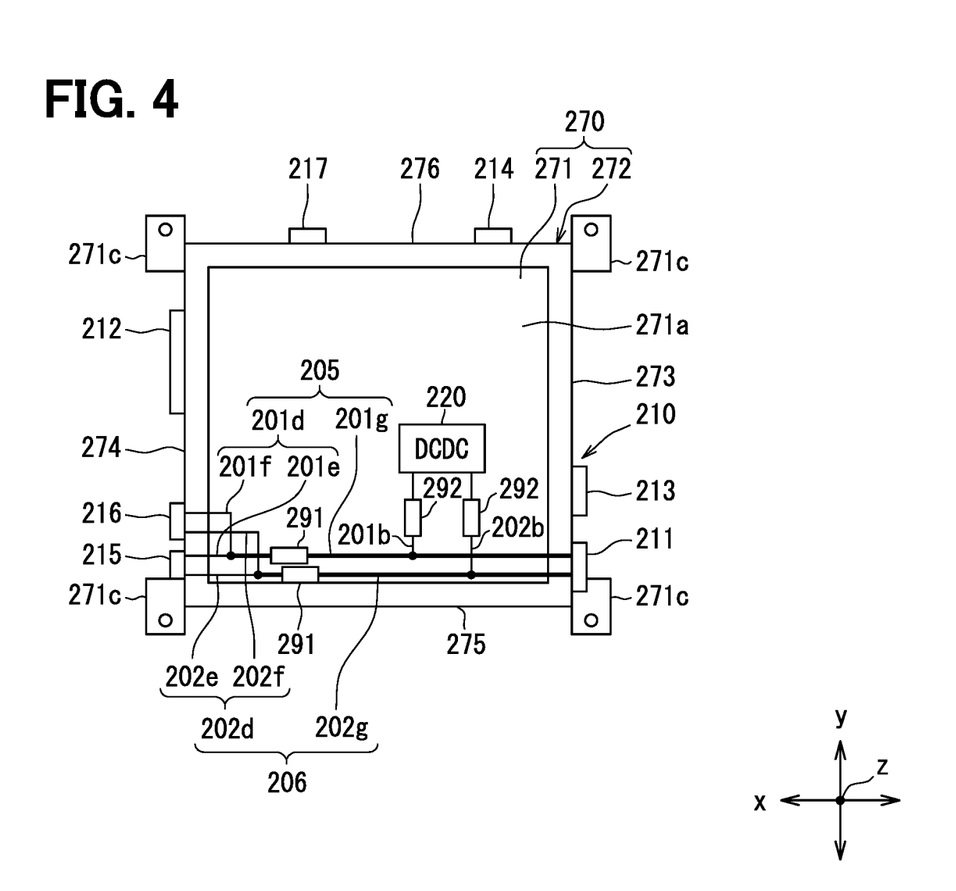
FIG. 4 is a schematic diagram for explaining a power line and a first filter according to a third embodiment.

Next, a third embodiment is described with reference to FIG. 4. The second embodiment shows an example in which the second filter 292 is provided on each of the positive common line 201g and the negative common line 202g. On the other hand, this embodiment shows a configuration in which the second filters 292 are provided on the second positive line 201b and the second negative line 202b, respectively.

According to this configuration, the current noise may output from the DCDC converter circuit 220, it is possible to reduce entering of the current noise into the front PCU 500 and the rear PCU 600. On the contrary, the current noise may output from the front PCU 500 and the rear PCU 600, it is possible to reduce entering of the current noise into the DCDC converter circuit 220.

In this embodiment, the front power connector 215 and the rear power connector 216 are provided on the outer horizontal wall 274 and is provided on a portion of the outer horizontal wall 274 close to the inner vertical wall 275.

Although the present disclosure is described with reference to the preferred embodiment, the present disclosure is not limited to the above-described embodiment but may be implemented with various modifications without departing from the spirit of the present disclosure.

Other Modifications

In the previous embodiments, examples are shown in which the system is provided with both the front MG 510 and the rear MG 610. However, it is also possible to adopt a configuration in which the system is provided with only one of MG among the front MG 510 and the rear MG 610. When only one of these two MGs is provided in the system, the system is provided with only one MG of the front MG 510 or the rear MG 610.

As described above, it should be understood that this specification discloses the following technical solutions.

Disclosure 1. An electric power distribution apparatus, comprising: a power source connector (211) connected to an in-vehicle power source (100); a plurality of power connectors (215, 216), which are capable of connecting to a plurality of in-vehicle power converter circuits (500, 600), respectively, and are capable of supplying power to a plurality of in-vehicle electric devices (510, 610), respectively; at least one power conductive member (205, 206), which includes a common conductive member (201g, 202g) connected to the power source connector and a plurality of branched conductive members (201e, 201f, 202e, 202f) branched from the common conductive member to the power connectors, respectively; and a noise reduction element (291) provided on a common conductive member.

Disclosure 2. The electric power distribution apparatus in disclosure 1, wherein the noise reduction element is provided on a portion of the common conductive member close to the branched conductive members.

Disclosure 3. The electric power distribution apparatus in disclosure 1 or 2, wherein each of the plurality of branched conductive members has a shorter length than that of the common conductive member.

Disclosure 4. The electric power distribution apparatus in any one of disclosure 1-3, wherein the power source connector and the plurality of power connectors are arranged next to each other.

Disclosure 5. The electric power distribution apparatus in any one of disclosure 1-4, further comprising: a power converter circuit (220) connected to the power source connector; an internal conductive member (201b, 202b) which connects the power converter circuit and the common conductive member; and a noise filter (292) provided on the internal conductive member or the common conductive member.

Disclosure 6. The electric power distribution apparatus in disclosure 5, wherein the noise filter is provided on the common conductive member, and wherein the internal conductive member is connected to a portion of the common conductive member between a portion of the common conductive member on which the noise filter is provided and a portion of the common conductive member on which the noise reduction element is provided.

Disclosure 7. The electric power distribution apparatus in disclosure 5, wherein the noise filter is provided on the internal conductive member, and wherein the internal conductive member is connected to a portion of the common conductive member between a portion of the common conductive member on which the noise reduction element is provided and a portion of the common conductive member connected to the power source connector.

What is claimed is:

1. An electric power distribution apparatus, comprising:
a power source connector connected to an in-vehicle power source;
a plurality of power connectors, which are capable of connecting to a plurality of in-vehicle power converter circuits, respectively, and are capable of supplying power to a plurality of in-vehicle electric devices, respectively;
at least one power conductive member, which includes a common conductive member connected to the power source connector and a plurality of branched conductive members branched from the common conductive member to the power connectors, respectively; and
a noise reduction element provided on a common conductive member.

2. The electric power distribution apparatus claimed in claim 1, wherein
the noise reduction element is provided on a portion of the common conductive member close to the branched conductive members.

3. The electric power distribution apparatus claimed in claim 1, wherein
each of the plurality of branched conductive members has a shorter length than that of the common conductive member.

4. The electric power distribution apparatus claimed in claim 1, wherein
the power source connector and the plurality of power connectors are arranged next to each other.

5. The electric power distribution apparatus claimed in claim 1, further comprising:
a power converter circuit connected to the power source connector;
an internal conductive member which connects the power converter circuit and the common conductive member; and
a noise filter provided on the internal conductive member or the common conductive member.

6. The electric power distribution apparatus claimed in claim 5, wherein
the noise filter is provided on the common conductive member, and wherein
the internal conductive member is connected to a portion of the common conductive member between a portion of the common conductive member on which the noise filter is provided and a portion of the common conductive member on which the noise reduction element is provided.

7. The electric power distribution apparatus claimed in claim 5, wherein
the noise filter is provided on the internal conductive member, and wherein
the internal conductive member is connected to a portion of the common conductive member between a portion of the common conductive member on which the noise reduction element is provided and a portion of the common conductive member connected to the power source connector.

* * * * *